(12) United States Patent
Kumaki

(10) Patent No.: US 11,595,578 B2
(45) Date of Patent: Feb. 28, 2023

(54) IMAGE PROCESSING APPARATUS AND IMAGE SENSING APPARATUS, METHODS OF CONTROLLING THE SAME, AND NON-TRANSITORY COMPUTER-READABLE STORAGE MEDIUM

(71) Applicant: CANON KABUSHIKI KAISHA, Tokyo (JP)

(72) Inventor: Satoshi Kumaki, Saitama (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 17/444,404

(22) Filed: Aug. 4, 2021

(65) Prior Publication Data

US 2022/0046171 A1 Feb. 10, 2022

(30) Foreign Application Priority Data

Aug. 7, 2020 (JP) .............................. JP2020-135070

(51) Int. Cl.
*H04N 5/232* (2006.01)
(52) U.S. Cl.
CPC ..... *H04N 5/23245* (2013.01); *H04N 5/23225* (2013.01); *H04N 5/23232* (2013.01); *H04N 5/232411* (2018.08)
(58) Field of Classification Search
CPC ........... H04N 5/23225; H04N 5/23232; H04N 5/23241–232411; H04N 5/23245
See application file for complete search history.

(56) References Cited

U.S. PATENT DOCUMENTS

2017/0330335 A1\* 11/2017 Hayashi .................... G06T 1/20
2020/0396384 A1\* 12/2020 Hu ............................ G06T 1/60

FOREIGN PATENT DOCUMENTS

JP 2004-312140 A 11/2004
WO 2017/168665 A1 10/2017

\* cited by examiner

*Primary Examiner* — Daniel M Pasiewicz
(74) *Attorney, Agent, or Firm* — Cowan, Liebowitz & Latman, P.C.

(57) ABSTRACT

The invention provides an image processing apparatus which comprises a controller which causes an image sensing device to execute either a first mode in which outputs image data of a first resolution, or a second mode in which outputs image data of a second resolution lower than the first resolution; and an evaluating circuit which, by outputting image data of the second resolution in relation to acquired image data, obtains an index value that relates to a spatial frequency of a frequency band in which a signal level decreases in image data of the second resolution more than in image data of the first resolution, wherein the evaluating circuit detects, by machine learning, the index value of image data of the second resolution, and the controller, based on the detected index value, selects either the first or second mode.

8 Claims, 13 Drawing Sheets

FIG. 5

| SPATIAL FREQUENCY DETECTION RESULT | NUMBER OF READOUT PIXELS | |
|---|---|---|
| | IMAGE QUALITY PRIORITY MODE | POWER SAVING PRIORITY MODE |
| A (HIGH) | 7680×4320 | 7680×4320 |
| B | 7680×4320 | 7680×4320 |
| C | 7680×4320 | 3840×2160 |
| D | 7680×4320 | 3840×2160 |
| E (LOW) | 3840×2160 | 3840×2160 |

FIG. 11

| SPATIAL FREQUENCY DETECTION RESULT | IMAGE ACQUISITION COUNT N |
|---|---|
| A (HIGH) | 16 |
| B | 16 |
| C | 4 |
| D | 4 |
| E (LOW) | 1 (NO COMPOSITING) |

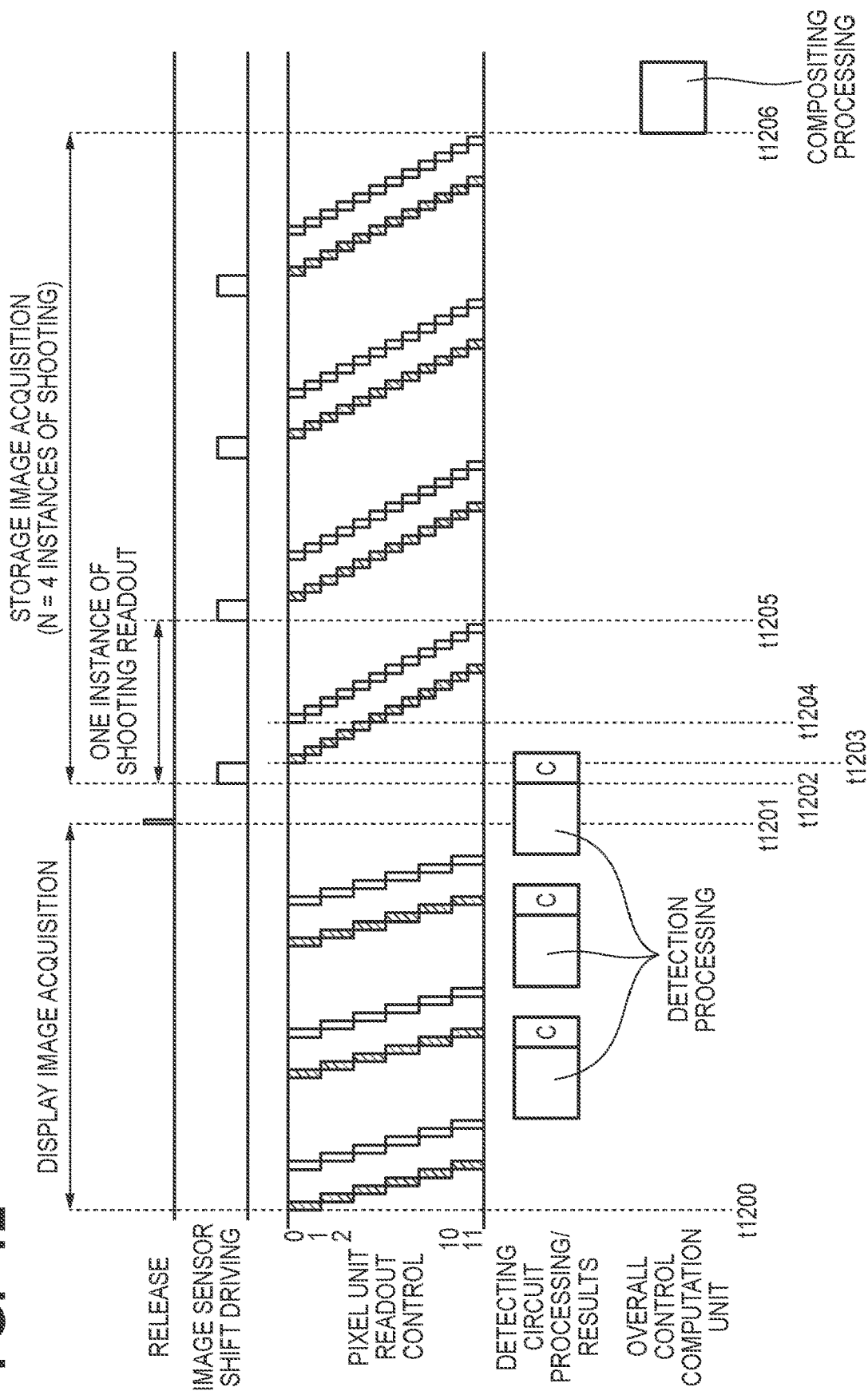

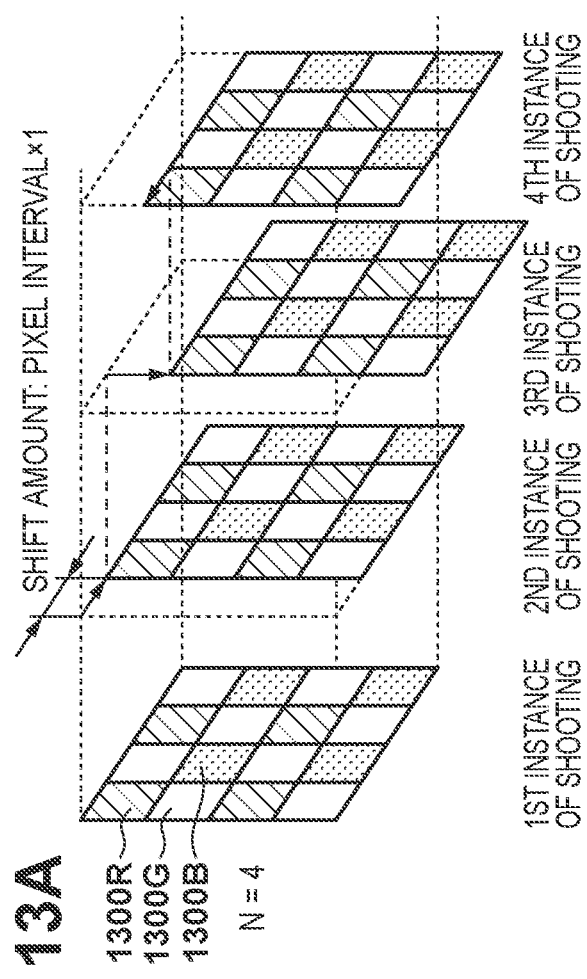
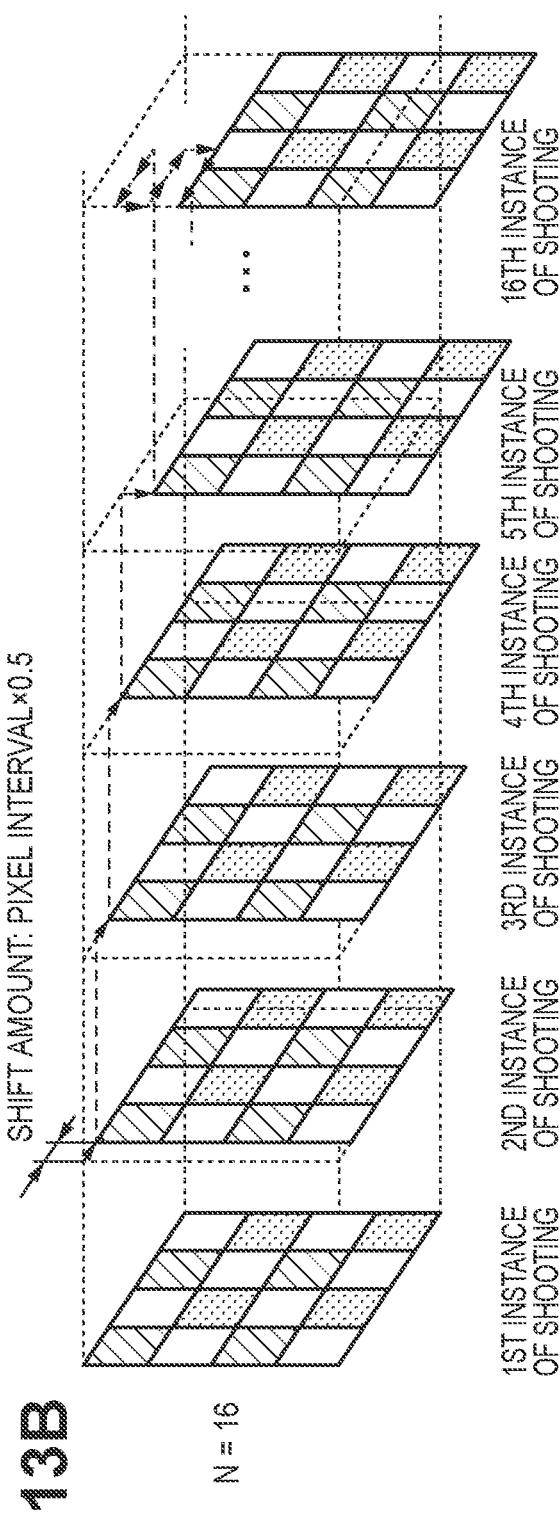

IMAGE PROCESSING APPARATUS AND IMAGE SENSING APPARATUS, METHODS OF CONTROLLING THE SAME, AND NON-TRANSITORY COMPUTER-READABLE STORAGE MEDIUM

BACKGROUND OF THE INVENTION

Field of the Invention

The present invention relates to an image processing apparatus and an image sensing apparatus, methods of controlling the same, and a non-transitory computer-readable storage medium.

Description of the Related Art

There are cases where driving for reducing the number of output pixels in accordance with a video format or resolution of a display for a live-view display is employed in an image sensing system such as a digital camera.

Japanese Patent Laid-Open No. 2004-312140 (hereinafter, Literature 1) proposes a method of performing a high-speed, low-power moving image shooting by performing readout from a solid-state image sensor via pixel mixing. A high speed readout makes it possible to have, in a period of one frame, a period in which readout is not performed, and turning off the power of an AD converter during such a period, for example, makes it possible to reduce the power required to acquire an image of one frame compared to a method of reading out at the same frame rate all the pixels without performing pixel mixing.

Incidentally, in a solid-state image sensor that employs a commonly-used Bayer pattern, pixels are divided into pixels that correspond to red/green/blue colors; accordingly, it is not possible to acquire all color information in a single pixel. Thus, information of colors to which a respective pixel does not correspond is acquired by performing interpolation in demosaicing processing at the time of development. As a result, high spatial frequency information is lost; accordingly, resolution is decreased in comparison to, for example, a three-chip image sensing apparatus that obtains color information of three colors in each pixel and the like. In a case of reading out via mixing processing the number of output pixels that accord with a video format, high spatial frequency information is similarly lost.

Meanwhile, reading out from a solid-state image sensor a number of pixels that is greater than the number of pixels necessary in a video format and the like via a readout without performing pixel mixing and then reducing the image at the time of development makes it possible to generate a high resolution video. Reduction is performed after demosaicing processing is performed while holding high spatial frequency information; accordingly, it is possible to improve the resolution. However, the number of pixels for which to perform AD conversion increases and processing takes time; accordingly, the power required to acquire an image at the same frame rate increases.

Also, from the viewpoint of memory capacity, there is a demand for reducing data size. It is possible to reduce data size by reducing the number of pixels in image data; however, high spatial frequency information will be reduced due to reduction in the number of pixels.

As described above, there is a trade-off between power and image quality or between data size and image quality depending on the number of pixels read out from a solid-state image sensor.

Incidentally, in recent years, image recognition by machine learning has been in use. There is a technique for performing feature extraction on captured image data by machine learning using, for example, a CNN (Convolutional Neural Network). WO2017/168665 (hereinafter, Literature 2) discloses a feature extraction element comprising a feature extraction unit in an image sensor.

However, there are cases where high resolution is or is not necessary depending on a subject. Accordingly, there are problems such as it is difficult to set a trade-off between appropriate resolution for a subject and power as well as between appropriate resolution for a subject and data size. In particular, since high spatial frequency information is lost at the time of a low resolution readout that employs pixel mixing and the like, it was difficult to perform determination based on an image.

SUMMARY OF THE INVENTION

The present invention provides a technique for controlling resolution and power that accords with a subject.

According to an aspect of the invention, there is provided an image processing apparatus, comprising: a controller configured to cause an image sensing device to execute either a first mode in which causing the image sensing device to output image data of a first resolution, or a second mode in which causing the image sensing device to output image data of a second resolution lower than the first resolution; and an evaluating circuit configured to, by causing the image sensing device to output image data of the second resolution in relation to acquired image data, obtain an index value that relates to a spatial frequency of a frequency band in which a signal level decreases in image data of the second resolution more than in image data of the first resolution, wherein the evaluating circuit detects, by machine learning, the index value of image data of the second resolution, and the controller, based on the index value detected by the evaluating circuit, selects either the first or second mode.

According to the present invention, it becomes possible to control resolution and power in accordance with a subject.

Further features of the present invention will become apparent from the following description of exemplary embodiments with reference to the attached drawings.

BRIEF DESCRIPTION OF THE DRAWINGS

FIG. 5 is a table illustrating a relationship between a detection result and the number of readout pixels according to a first embodiment.

FIG. 11 is a view illustrating a relationship between a detection result and an image acquisition count according to a fourth embodiment.

FIG. 12 is a timing chart illustrating readout control of the image sensing apparatus according to the fourth embodiment.

FIGS. 13A and 13B are views illustrating shift driving of the solid-state image sensor according to a fourth embodiment.

DESCRIPTION OF THE EMBODIMENTS

Figure 1:
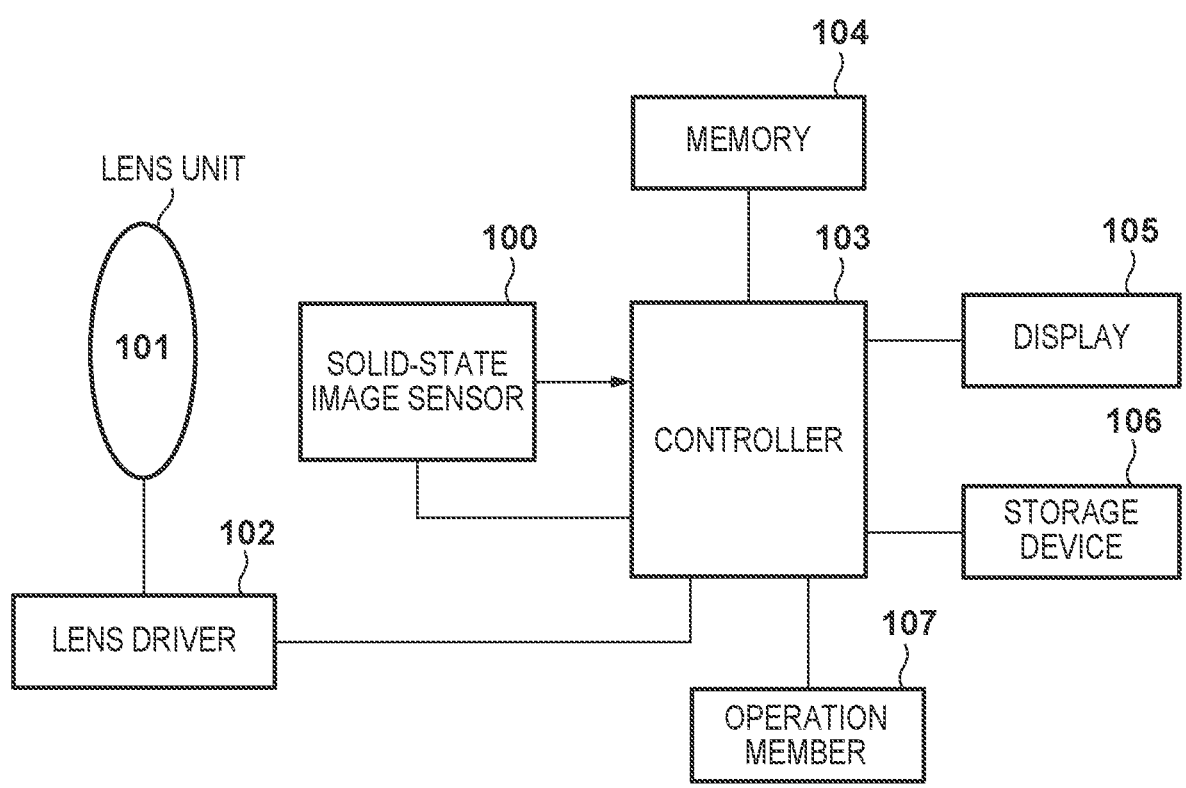
FIG. 1 is a view illustrating a configuration of an image sensing apparatus as an image processing apparatus according to a first embodiment.

Hereinafter, embodiments will be described in detail with reference to the attached drawings. Note, the following embodiments are not intended to limit the scope of the claimed invention. Multiple features are described in the embodiments, but limitation is not made an invention that requires all such features, and multiple such features may be combined as appropriate. Furthermore, in the attached drawings, the same reference numerals are given to the same or similar configurations, and redundant description thereof is omitted.

First Embodiment

An image processing apparatus and a solid-state image sensor and a method of driving thereof in a first embodiment will be described.

In the first embodiment, a spatial-frequency detecting circuit that uses machine learning detects, as spatial frequency information, spatial frequency in a high-resolution image, for which all pixels have been read out, from a low-resolution image, for which pixel mixing has been employed for readout. With this, a high-resolution image readout, which is a first readout, and a low-resolution image readout, which is a second readout, are switched in accordance with a spatial frequency of a subject.

FIG. 1 is a block configuration diagram of an image sensing apparatus as an image processing apparatus according to the first embodiment.

A solid-state image sensor 100 converts an optical image formed by a lens unit 101, which is an optical system, to a signal. A lens driver 102 performs focus driving and aperture driving for the lens unit 101 in accordance with a control signal from a controller 103.

The controller 103 is configured by a ROM, which stores a CPU and programs that the CPU executes, and a RAM, which is used as a work area. Also, the controller 103 performs control of the entire image sensing apparatus, which includes control of the solid-state image sensor 100 and correction/development of signals outputted by the solid-state image sensor 100. In addition, the controller 103 acquires from the solid-state image sensor 100 image data with a resolution (the number of pixels) that is greater than or equal to that necessary for a video format and the like, and, at the time of development, generates video data by reducing to the resolution of a video format.

A memory 104 temporarily stores image data, and a display 105 performs display of various kinds of information and captured images. A storage device 106 is an attachable/detachable storage device, such as a semiconductor memory, for performing storage and readout of image data. An operation member 107 is various kinds of interface of the image sensing apparatus. The controller 103 controls each block in accordance with signals from the operation member 107 and performs processing that a user intended.

Figure 2:
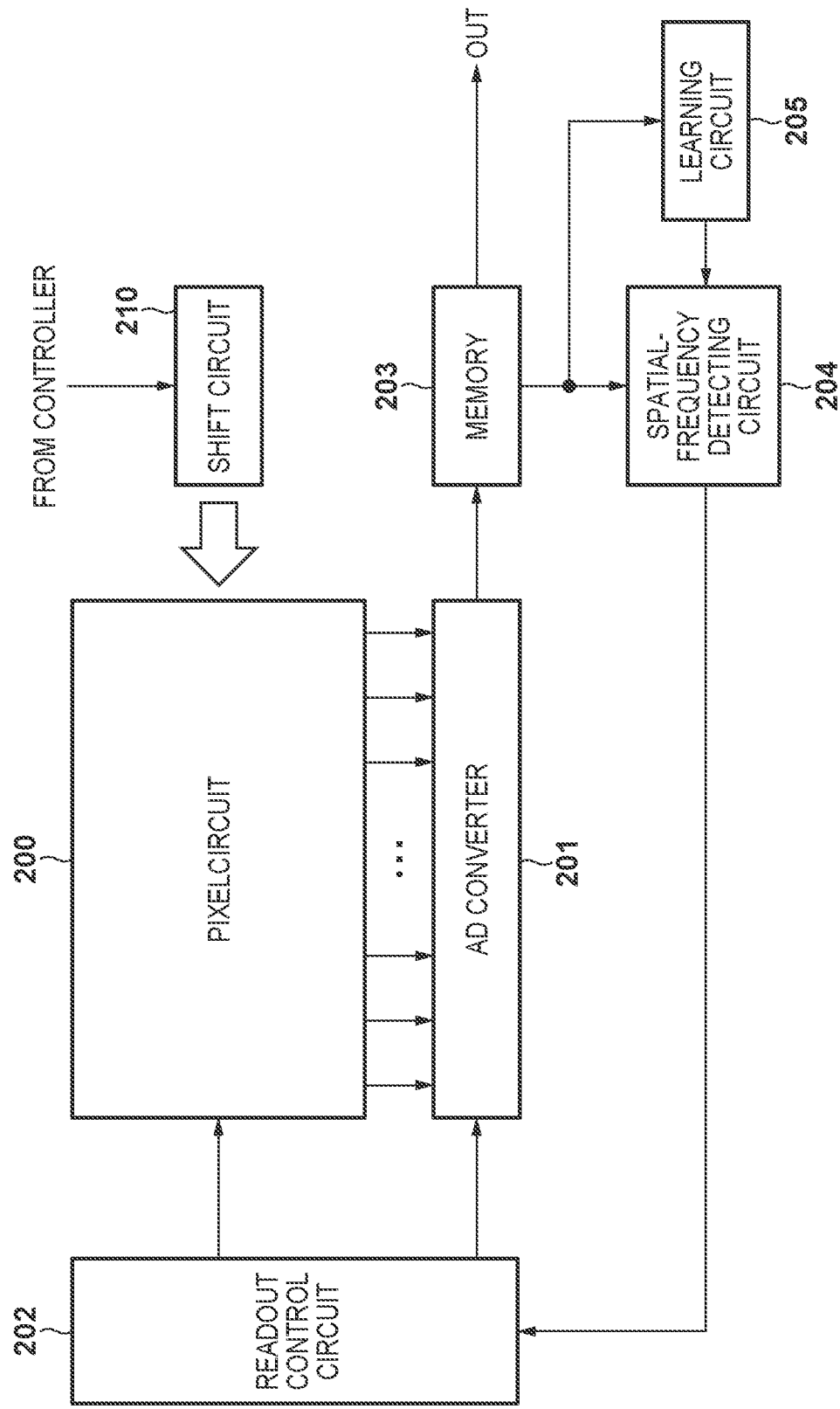
FIG. 2 is a view illustrating a configuration of a solid-state image sensor according to the first embodiment.

Next, a configuration of the solid-state image sensor 100 of the present embodiment will be described. FIG. 2 is a circuit diagram illustrating a configuration of the solid-state image sensor 100 according to the first embodiment.

In FIG. 2, a shift circuit 210, in accordance with a control signal from the controller 103, moves (shifts) the position of a pixel circuit 200 by a preset distance in vertical and horizontal directions.

In the pixel circuit 200, a plurality of unit pixels comprising a photoelectric converter (photodiode) are arranged in an array, and each pixel converts incident light to an electric signal and outputs it to an AD converter 201 as a pixel signal. The pixel circuit 200 is controlled by a readout control circuit 202, and there are a high resolution readout in which all unit pixels are read out individually and a low resolution readout in which pixel signals of a plurality of unit pixels are combined and then read out. Unit pixels and assembling of combinations will be described using FIG. 3. Note that even if the number of pixels is the same in video data obtained by reduction of data obtained by a high resolution readout and video data obtained by a low resolution readout, it can be assumed that the former will have the higher resolution. This is because it is possible to, when reducing data obtained by a high resolution readout, prevent a signal level of a high-frequency component from decreasing by analyzing an edge strength, an edge direction, a noise state, or the like and then performing appropriate filtering processing.

The AD converter 201 converts analog pixel signals outputted from the pixel circuit 200 to digital signals. For example, the AD converter 201 comprises a plurality of AD converters corresponding to each column of the pixel circuit 200 and converts analog pixel signals from the pixel circuit 200 to digital signals by row in parallel. The AD-converted pixel signals are transmitted to a memory 203 as an AD conversion result. Regarding the AD converter 201, in a high resolution readout, all AD converters are used. Meanwhile, in a low resolution readout, for example, only the AD converter of one column out of two columns will be used and will be driven only at the time of one row out of two rows (even numbered row or odd numbered row). Accordingly, in a low resolution readout, power consumption of the AD converter 201 required for reading out an image of one frame decreases in comparison to the time of a high resolution readout. Also, in a low resolution readout, less AD conversion results are outputted from the AD converter 201 in the same range of the pixel circuit 200 in comparison to a high resolution readout.

The readout control circuit 202 performs control of the pixel circuit 200 and the AD converter 201. Note that it is assumed that the readout control circuit 202 in the embodiment performs readout at a predetermined frame rate (e.g., 30 frames/sec).

The memory 203 functions as a signal holding unit, which temporarily holds digital pixel signals from the AD converter 201. The memory 203 is configured to be able to hold pixel signals of a plurality of frames.

A spatial-frequency detecting circuit 204 detects spatial frequency in an image of one frame from the pixel signals temporarily held in the memory 203. Also, the spatial-frequency detecting circuit 204 comprises a learning model that uses a machine learning algorithm such as a convolutional neural network. By such a configuration, spatial frequency in a high resolution readout is detected from a low-resolution image inputted at the time of a low resolution readout. In other words, an estimation of what a spatial frequency level of a frequency band in which a signal level has decreased due to a low resolution readout from the low-resolution image would have been in a case of a high resolution readout. At the time of a high resolution readout, configuration may be taken so as to convert to a low-resolution image and then detect spatial frequency in a high resolution readout or detect spatial frequency by a known frequency analysis means without using a learning model. The spatial-frequency detecting circuit 204 outputs a detection result to the readout control circuit 202. The readout control circuit 202 switches a high resolution readout/low resolution readout based on the detection result.

A learning circuit 205 subjects a learning model of the spatial-frequency detecting circuit 204 to machine learning so as to be able to detect spatial frequency in a high resolution readout from a low-resolution image using a high-resolution image held in the memory 203. The details of this learning circuit 205 will be described later using FIG. 7.

Figure 3:
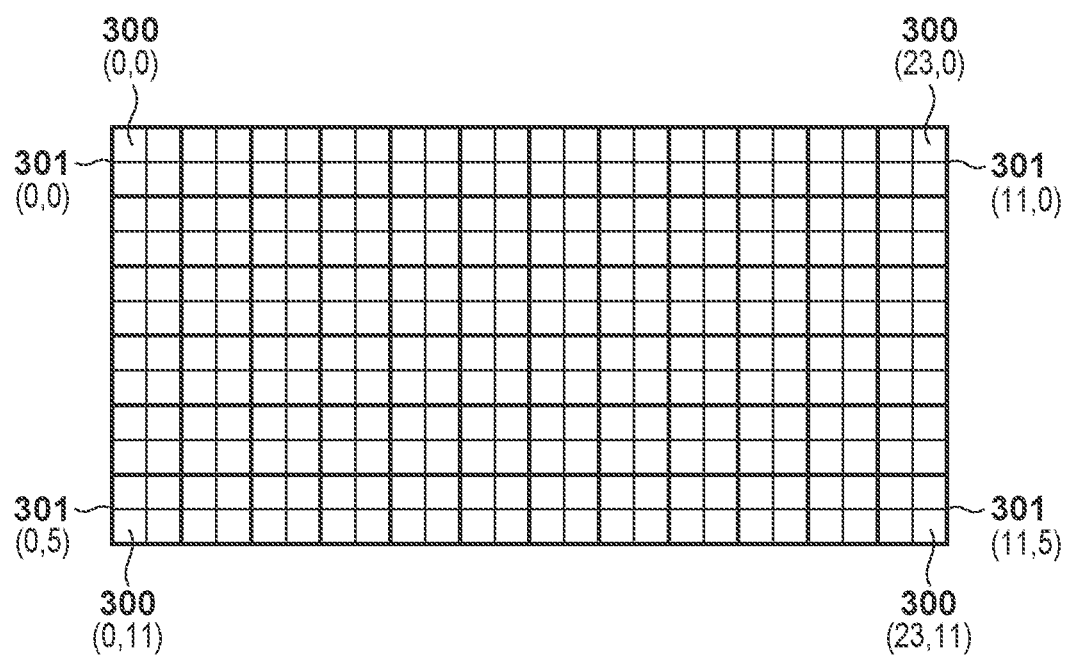
FIG. 3 is a view illustrating combination pixels in a low resolution readout according to the first embodiment.

Next, assembling combinations of unit pixels in a low resolution readout will be described with reference to FIG. 3. FIG. 3 is a view illustrating combination pixels in a low resolution readout according to the first embodiment. In FIG. 3, to simplify the description, an example in which a total of 288 pixels (24 pixels horizontally×12 pixels vertically) of unit pixels 300 of the same color are arranged in the pixel circuit 200 is illustrated. In practice, regarding the pixel circuit 200, the unit pixels 300 comprising R, G, and B color filters that respectively correspond to red/green/blue incident light are arranged in a Bayer array.

The neighboring unit pixels 300 (2 pixels horizontally/2 pixels vertically) of the same color, as a combination pixel 301, are combined as an analog signal in a vertical line (not shown) or the AD converter and is AD-converted as one digital pixel signal. In other words, in a low resolution readout, a total of 72 pixels (12 pixels horizontally×6 pixels vertically) of combination pixels 301 is read out and the number of pixels to be read out will be ¼ of a high resolution readout.

Next, details of spatial frequency detection processing of the spatial-frequency detecting circuit 204 will be described using FIG. 4.

Figure 4:
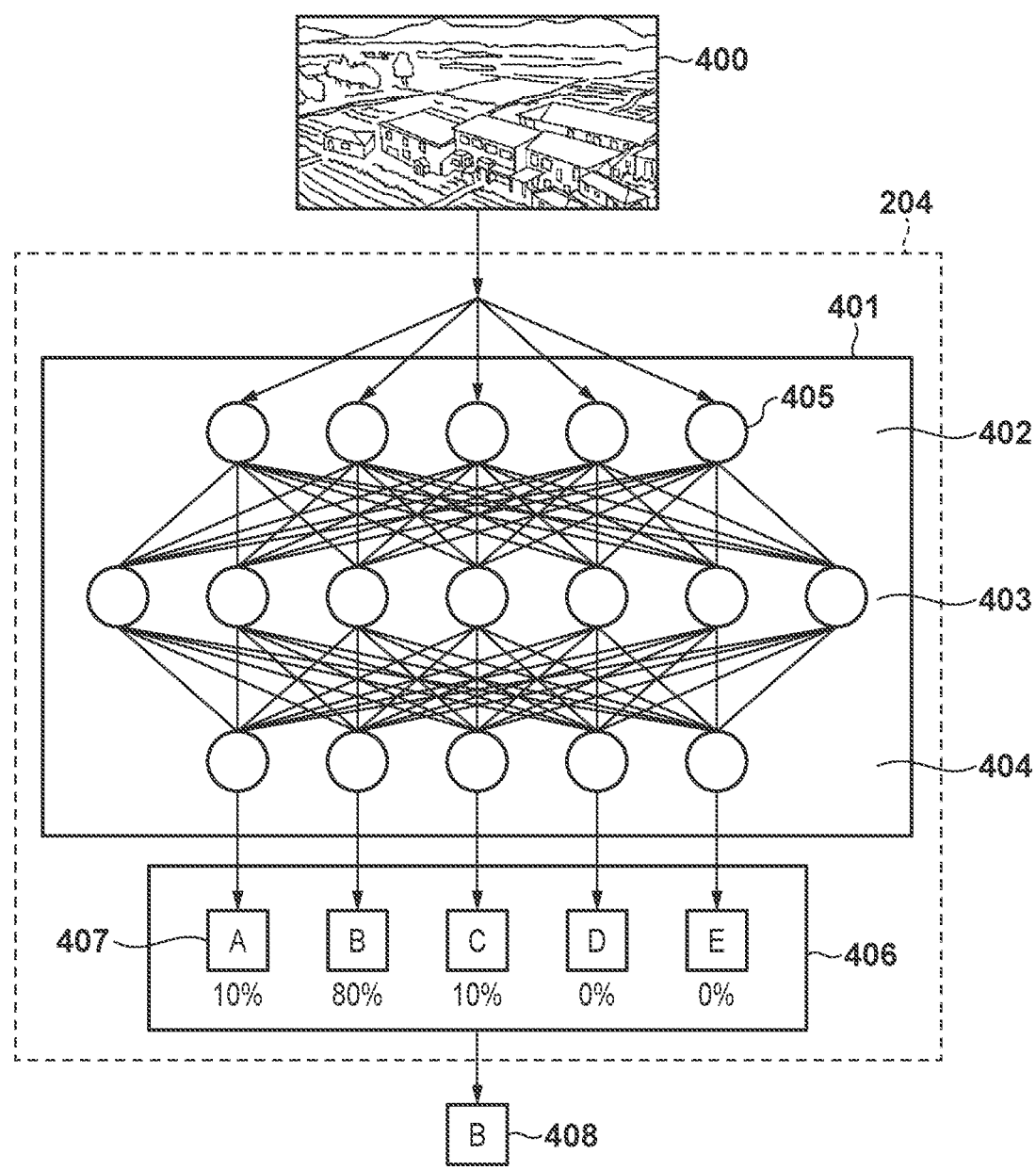
FIG. 4 is a view illustrating functional blocks of a spatial-frequency detecting circuit according to the first embodiment.

FIG. 4 is a view illustrating functional blocks of the spatial-frequency detecting circuit 204 according to the first embodiment. The spatial-frequency detecting circuit 204 comprises a learning model 401 and a determination unit 406.

The learning model 401 is a learning model that uses a convolutional neural network and comprises processing layers of a three-layer structure of an input layer 402, an intermediate layer 403, and an output layer 404. Note that in FIG. 4, a case where the intermediate layer is one layer is illustrated; however, regarding the intermediate layer, a plurality of layers may be arranged.

The input layer 402, the intermediate layer 403, and the output layer 404, comprises a plurality of nodes 405 which perform, in parallel, determination of spatial frequency in a high resolution readout of an inputted low-resolution image 400.

Each node of the input layer 402 is respectively connected with all nodes of the intermediate layer 403. Each node of the intermediate layer is respectively connected with all nodes of the output layer 404. As described above, the learning model 401 is a neural network structure in which nodes are connected to each other.

Into the nodes 405 of the input layer 402, the low-resolution image 400 held in the memory 203 is inputted. At the time of a high resolution readout, processing that is the same as pixel mixing is performed by a compression unit (not shown) and a result which has been converted to a low-resolution image is inputted.

Each node of the input layer 402 performs determination of whether or not high spatial frequency is included in a high resolution readout from the inputted low-resolution image and outputs to the nodes of the intermediate layer 403 a determination result, which becomes increasingly weighted as the possibility that the image may be of corresponding spatial frequency in a high resolution readout increases. The intermediate layer 403 performs the same determination and outputs to the nodes of the output layer 404 a determination result, which becomes increasingly weighted as the possibility that the image may be of corresponding spatial frequency increases. The output layer 404 outputs to the determination unit 406 a determination result 407 which is whether or not and how much of high spatial frequency the low-resolution image inputted in the end includes in a high resolution readout, respectively weighted for each predetermined spatial frequency level. The determination unit 406 outputs an index value which represents the degree to which high frequency by frequency conversion are included. More specifically, the determination unit 406, for example, divides the spatial frequency into five levels (A to E) of spatial frequency and determines which spatial frequency is high. Determination A indicates that many of the highest spatial frequencies are included in a high resolution readout. Determination E indicates the least number of high spatial frequencies in a high resolution readout. Note that it is assumed that the spatial frequency levels are divided into five levels here; however, there is no particular limitation to the number of levels into which spatial frequency is classified.

The determination unit 406 determines the level of spatial frequency in a high resolution readout based on the determination result 407, which was weighted for each spatial frequency level outputted from the output layer 404, and outputs a result 408 thereof. To provide a more specific example, the determination unit 406 outputs, as the determination result (evaluation result) 408, the spatial frequency level that was the most heavily weighted result in the determination result 407. This determination result is transmitted to the readout control circuit 202 as spatial frequency detection result information.

Here, in order for the learning model 401 to accurately perform weighting of whether or not each spatial frequency level is included in a high resolution readout based on a low-resolution image, it is necessary to perform machine learning based on training data consisting of an inputted low-resolution image and ground truth data, which indicates the level of spatial frequency included in a case of reading out at high resolution. The details of this learning method will be described in FIG. 7.

Next, control of the readout control circuit 202 will be described with reference to FIG. 5. FIG. 5 is a table illustrating a relationship between a detection result and the number of readout pixels (the number of horizontal pixels× the number of vertical pixels) according to the first embodiment. In FIG. 5, control of the readout control circuit 202 for when shooting a 4K video is illustrated.

The number of readout pixels 7680×4320 corresponds to the high resolution readout, and the read out high-resolution image, by being reduced after development in the controller 103, forms a frame of a high resolution 4K video. Meanwhile, the number of readout pixels 3840×2160 corresponds to the low resolution readout. Control is performed such that in a case where the spatial frequency detection result indicates high, a high resolution readout is set and in a case where the detection result indicates low, a low resolution readout is set. Setting to a low resolution readout in a case where high spatial frequency is not included makes it possible to reduce power without losing image quality.

In the image sensing apparatus of the present embodiment, there are two modes: an image quality priority mode and a power saving priority mode. For example, in a case where there is a lot of power remaining in a battery, the image quality priority mode is set and in cases other than that, the power saving priority mode is set. Also, for example, in order to avoid interrupting a video due to heat generation at the time of moving image shooting, configuration may be taken so as to set to a power saving priority mode in a case where the image sensing apparatus is at a high temperature. As described above, the image sensing apparatus may set the mode; however, a configuration may be taken such that the user can set the mode in advance. Note that determination of the amount of power remaining and the level of temperature is determined in accordance with comparison with respectively set thresholds.

The image quality priority mode and the power saving priority mode differ in a detection result threshold at which a low resolution readout and a high resolution readout are switched. In the example of FIG. 5, control is performed such that in the image quality priority mode, the switch is made between the detection results D and E and in the power saving priority mode, the switch is made between the detection result B and C. Causing the thresholds to differ by such a plurality of modes makes it possible to aim to achieve both image quality and power usage that are more suitable for the situation.

Next, readout control of the image sensing apparatus according to the present embodiment will be described with reference to FIG. 6.

Figure 6:
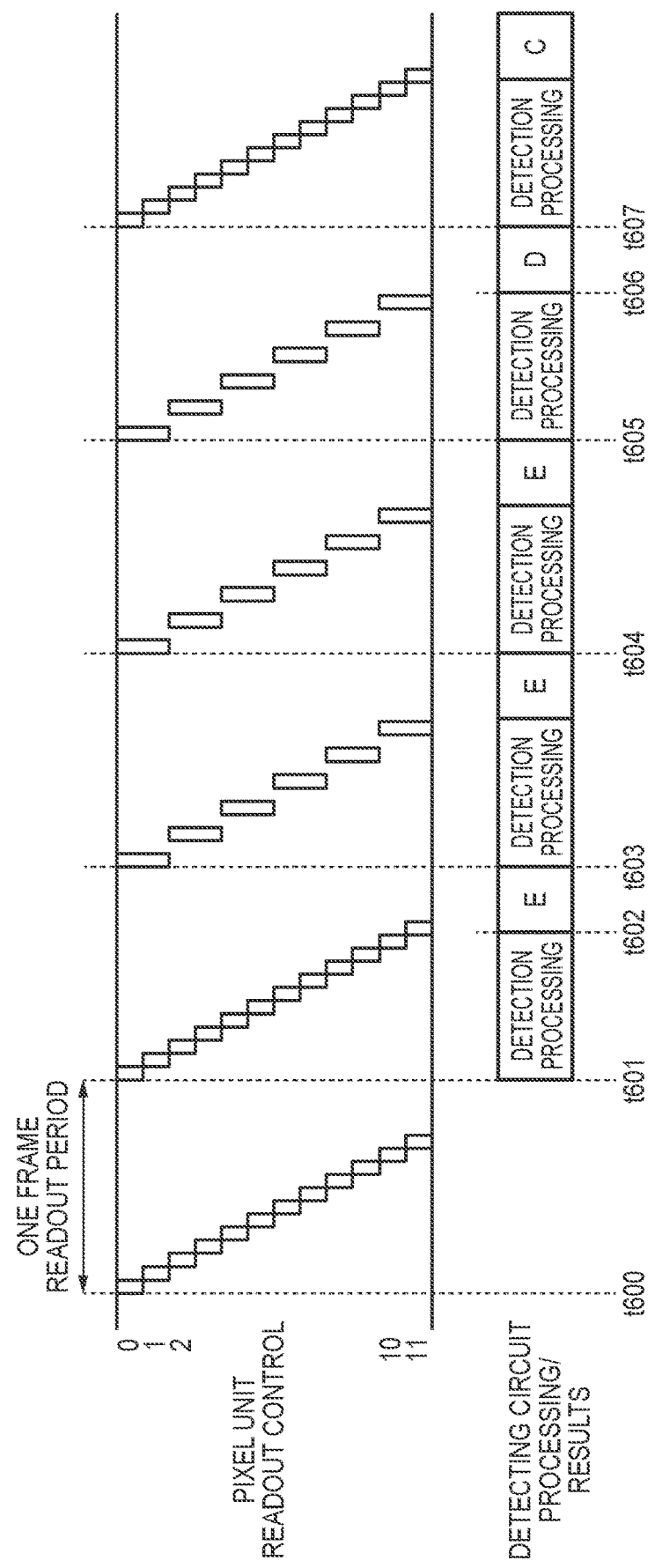
FIG. 6 is a timing chart illustrating readout control of the image sensing apparatus according to the first embodiment.

FIG. 6 is a timing chart illustrating readout control of the image sensing apparatus according to the first embodiment. In FIG. 6, an example of six frames in which readout control switches in a moving image shooting is illustrated. Also, an example in the image quality priority mode is illustrated here. Regarding the power saving priority mode, description will be omitted as it only differs in the threshold.

In in the drawing, in the "pixel unit readout control", rows of unit pixels 300 read out from the pixel circuit 200 and readout timings are schematically illustrated. Also, note that in order to simplify the description, the number of rows of unit pixels 300 read out in one frame is illustrated as 12 rows. Also, in the drawing, the "detecting circuit processing/results" illustrates timings, at which the spatial-frequency detecting circuit 204 performs detection processing, and detection results.

Next, driving of the solid-state image sensor will be described following the timing. At timing t600, the first one-frame high resolution readout is started and the pixel signals of the unit pixels 300 are sequentially AD-converted by row. Regarding the first one frame, there is no information of what kind of spatial frequency it includes; accordingly, a high resolution readout is performed.

At timing t601, readout of the next frame is started. At this timing, there has yet to be a detection result; accordingly, a high resolution readout is started next. Also, at the same time, detection of spatial frequency is performed in the spatial-frequency detecting circuit 204 based on an image of the first frame.

At timing t602, detection processing (detection processing for an image of the first frame) ends and a detection result E is outputted. In accordance with the detection result, the readout control circuit 202 switches readout control from the time of starting the next frame.

At timing t603, readout of the next frame is started. In accordance with the detection result E of the spatial-frequency detecting circuit 204, a low resolution readout is performed. In the pixel circuit 200, neighboring two rows of unit pixels 300 are simultaneously read out as the combination pixel 301. Accordingly, readout is sequentially performed by two rows; however, it is advantageous to adjust the readout intervals such that the read out time period required to acquire an image of one frame does not change. This is because bringing the effects of a phenomenon, in which a subject moving at a high speed appears distorted due to sequentially reading out by row, to coincide in a high resolution readout and a low resolution readout makes it possible to avoid this phenomenon from being easily perceived due to non-consecutive switching.

At timing t604, readout of an image in which a state of the subject has changed is performed. For example, spatial frequency increases due to narrowing of the aperture of a lens, from a subject whose aperture is close to being released and blurring is strong. At timing t606, a detection result D is outputted due to the change in a state of the subject. Even in a low resolution readout, in the spatial-frequency detecting circuit 204 that uses machine learning, it is possible to detect spatial frequency in a high resolution readout; accordingly, it is possible to detect the change in spatial frequency due to the change in the subject.

At timing t607, in accordance with the detection result D, a switch is made to a high resolution readout, and a readout of one frame is started.

Note that the controller 103 generates low resolution image data in the development processing of high resolution frames read out at timings t600, t601, and t607. As a result, video frames in which resolution of all the frames have been unified are generated and then outputted.

Figure 7:
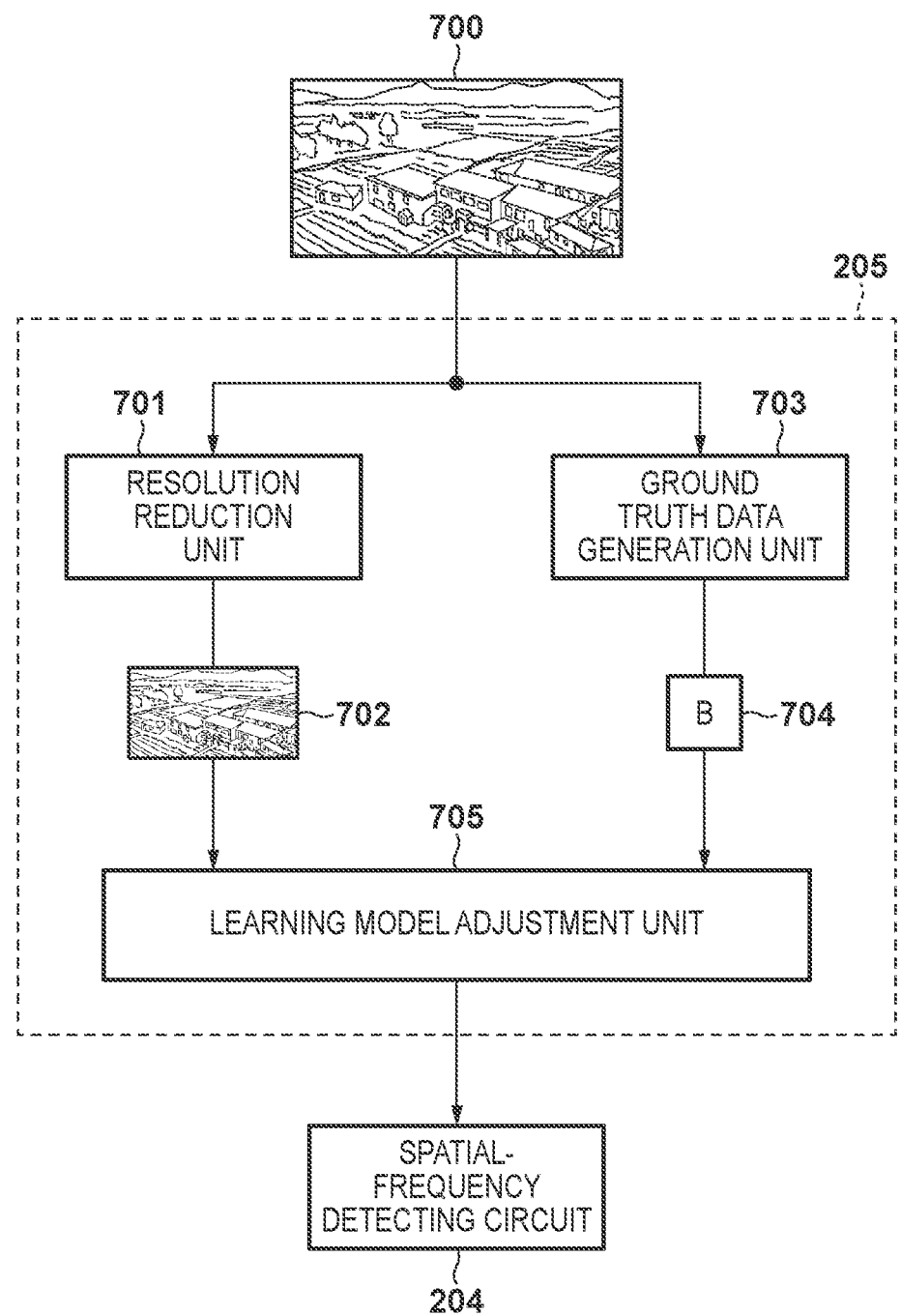
FIG. 7 is a view illustrating functional blocks of a learning circuit according to the first embodiment.

Next, the learning circuit 205 and learning processing of the image sensing apparatus according to the present embodiment will be described. FIG. 7 is a view illustrating functional blocks of the learning circuit 205 according to the first embodiment.

The learning circuit 205 generates a learning model for detecting (estimating) the level of spatial frequency in a high resolution readout from a low-resolution image using a high-resolution image.

The learning circuit 205 is configured by a resolution reduction unit 701, a ground truth data generation unit 703, and a learning model adjustment unit 705.

In the learning circuit 205, a high-resolution image 700 is inputted as training data from the memory 203.

The resolution reduction unit 701 converts the inputted high-resolution image 700 to a low resolution reproduced image 702. The conversion processing is processing that replicates the mixing processing in the pixel circuit 200 and the AD converter 201. In the present embodiment, processing in which an average output of a total of 4 neighboring pixels (2 pixels horizontally×2 pixels vertically) are set as a pixel signal of one combination pixel is performed.

The ground truth data generation unit 703 calculates a spatial frequency level of the inputted high-resolution image 700. More specifically, known spatial frequency detection processing, for example, a two-dimensional Fourier transform, is performed and spatial frequency is calculated. Then, the level of spatial frequency of the inputted high-resolution image 700 is decided in accordance with the maximum frequency among the frequency components whose amplitudes exceed a threshold, and ground truth data 704 is outputted.

The learning model adjustment unit 705 adjusts the output of each node 405 of the learning model illustrated in FIG. 4 such that by inputting the low resolution reproduced image 702 and the ground truth data 704, a spatial frequency level of a high-resolution image, which is ground truth data, can be detected in association from the low resolution reproduced image 702.

Repeatedly performing the above processing using a plurality of high-resolution images 700 makes it possible for a learning model to detect the level of spatial frequency in a high resolution readout from a low-resolution image.

The above learning processing is performed, for example, at the time of factory adjustment of the image sensing apparatus; however, configuration may be taken so as to comprise a learning mode in which learning processing is performed after shipment such that it is performed when the user sets a shooting mode of the image sensing apparatus to the learning mode.

The above-described configuration makes it possible for the image sensing apparatus of the first embodiment to detect spatial frequency in a high resolution readout even in a low resolution readout; accordingly, it is possible to select an appropriate readout method also when a subject changes to a state in which it includes a high spatial frequency. As described above, it becomes possible to control resolution and power in accordance with a subject at all times.

Note that in the present embodiment, the learning circuit 205 is arranged within the solid-state image sensor 100; however, the present invention is not limited to this, and the learning circuit 205 may be configured outside the solid-state image sensor 100.

Also, in the present embodiment, a low resolution readout is configured such that mixing processing is performed on a plurality of unit pixels; however, the present invention is not limited to this, and configuration may be taken so as to, for example, output as a representative value a pixel signal of one unit pixel within a plurality of unit pixels.

Also, in the above-described embodiment, the pixel circuit 200 in the solid-state image sensor 100 has been described to output pixel data of a single color component. Then, configuring such that the rate of operation of the AD converter 201 at the time of reading out a low-resolution image is ¼ of that at the time of high resolution by configuring such that one pixel of a low resolution readout image corresponds to 2×2 pixels of a high resolution readout image makes it possible to reduce power.

Second Embodiment

Figure 8:
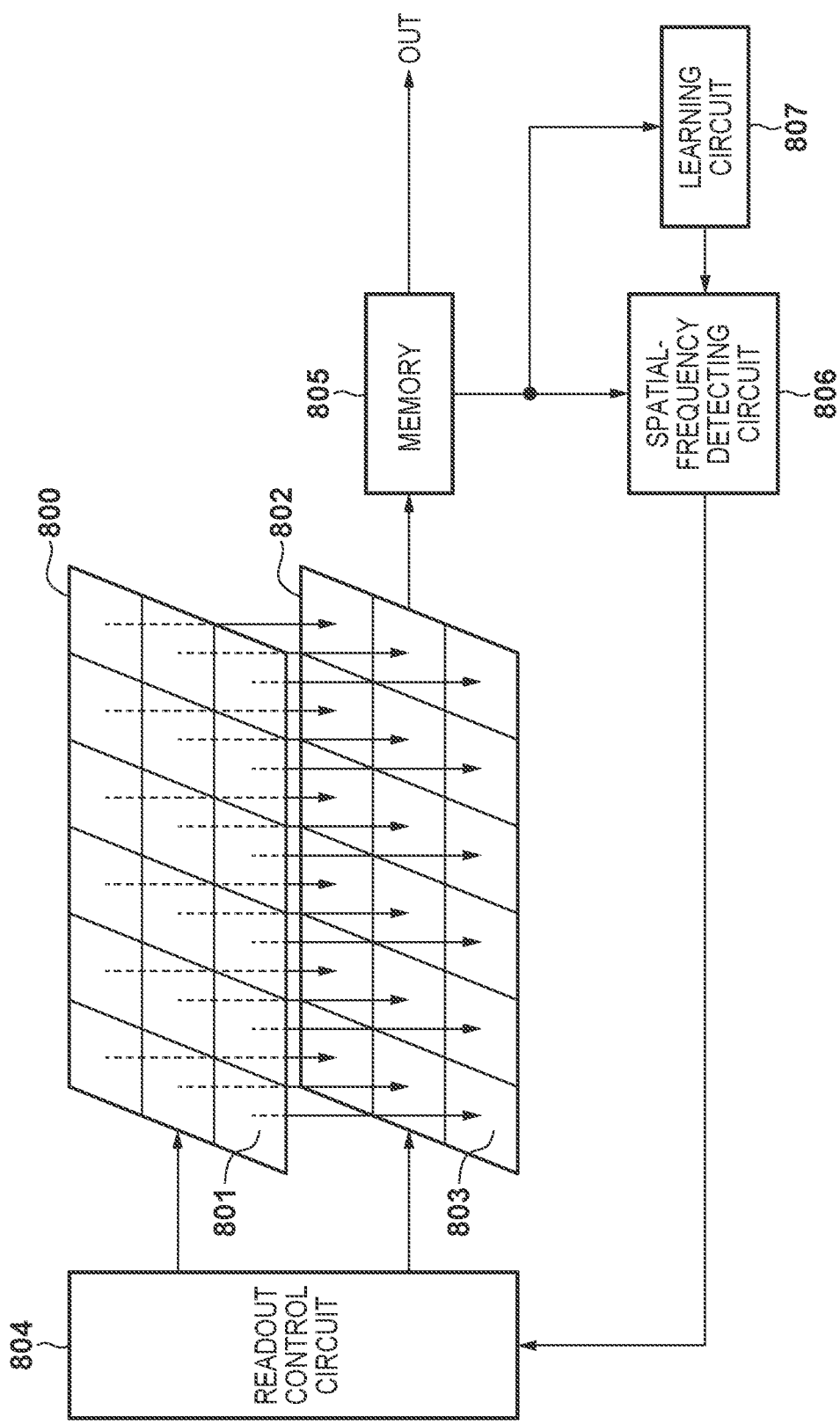
FIG. 8 is a view illustrating a configuration of the solid-state image sensor according to a second embodiment.

In the following, a solid-state image sensor according to a second embodiment will be described with reference to FIG. 8 and FIG. 9. The second embodiment performs detection of spatial frequency and switching of a high resolution readout/low resolution readout for each sub-region within the pixel unit. In other words, the second embodiment can perform control of resolution and power that accords with a subject for each region and can perform more appropriate control even in a state in which the spatial frequency that is included is different for each region.

In the following, in the second embodiment, points that are different from the previously-described first embodiment will be described.

First, a configuration of the solid-state image sensor according to the second embodiment will be described. FIG. 8 is a circuit diagram illustrating a configuration of the solid-state image sensor 100 according to the second embodiment.

The solid-state image sensor 100 in the second embodiment is different in the configurations of a pixel unit 800 and an AD converter 802 in comparison to the solid-state image sensor according to the first embodiment.

Regarding the pixel unit 800, a plurality of divided pixel regions 801 are arranged in an array. The divided pixel regions 801 are configured to divide the unit pixels arranged in the pixel unit 800 into an array and, in the example of FIG. 8, are configured to divide horizontally into 6 and vertically into 3.

Regarding the AD converter 802, a plurality of AD converters 803 are arranged in an array. The AD converters 803 are the same in number as the divided pixel regions 801, are arranged in the same manner, and perform AD conversion of pixel signals of unit pixels, which are arranged in the divided pixel regions 801 arranged in the same position.

A readout control circuit 804 performs control for each divided pixel region 801 and the corresponding AD converter 803. By this configuration, readout of an image of one frame is performed by the respective AD converters 803 performing processing of performing AD conversion of pixel signals of unit pixels arranged in the same divided pixel region 801 in order.

In a high resolution readout, the AD converters 803 individually perform AD conversion on pixel signals of all unit pixels in the respectively corresponding divided pixel region 801 in sequence.

Meanwhile, in a low resolution readout, similarly to the first embodiment, neighboring unit pixels (2 pixels horizontally/2 pixels vertically) of the same color, as a combination pixel, are combined as analog signals in signal lines (not shown) or in the AD converter and are AD-converted as one digital pixel signal. Then, the AD converters 803 individually perform AD conversion on pixel signals of all combination pixels in the respectively corresponding divided pixel region 801 in sequence. By performing AD conversion as a combination pixel, similarly to the first embodiment, the number of pixels read out in a low resolution readout is ¼ in comparison to a high resolution readout. Accordingly, in a low resolution readout, fewer number of AD conversion results are outputted from the AD converter 802 in the divided pixel region 801 in comparison to a high resolution readout.

Each of the high-resolution image and the low-resolution image for each read-out region are developed in the controller 103. At that time, the high-resolution images, upon reduction processing, are composited with the low-resolution images. By this, a frame with the number of pixels that conforms to a video format is generated.

Such a configuration achieves a configuration in which a high resolution readout/low resolution readout can be switched for each divided pixel region 801 and corresponding AD converter 803. In a low resolution readout, in a readout of an image of one frame, the number of AD conversions that the AD converters 803 perform is reduced. Accordingly, it becomes possible to turn off the power of the AD converters 803 while AD conversion is not being performed and obtain an effect of reducing power.

Next, a configuration of a spatial-frequency detecting circuit 806 according to the second embodiment will be described with reference to FIG. 9.

Figure 9:
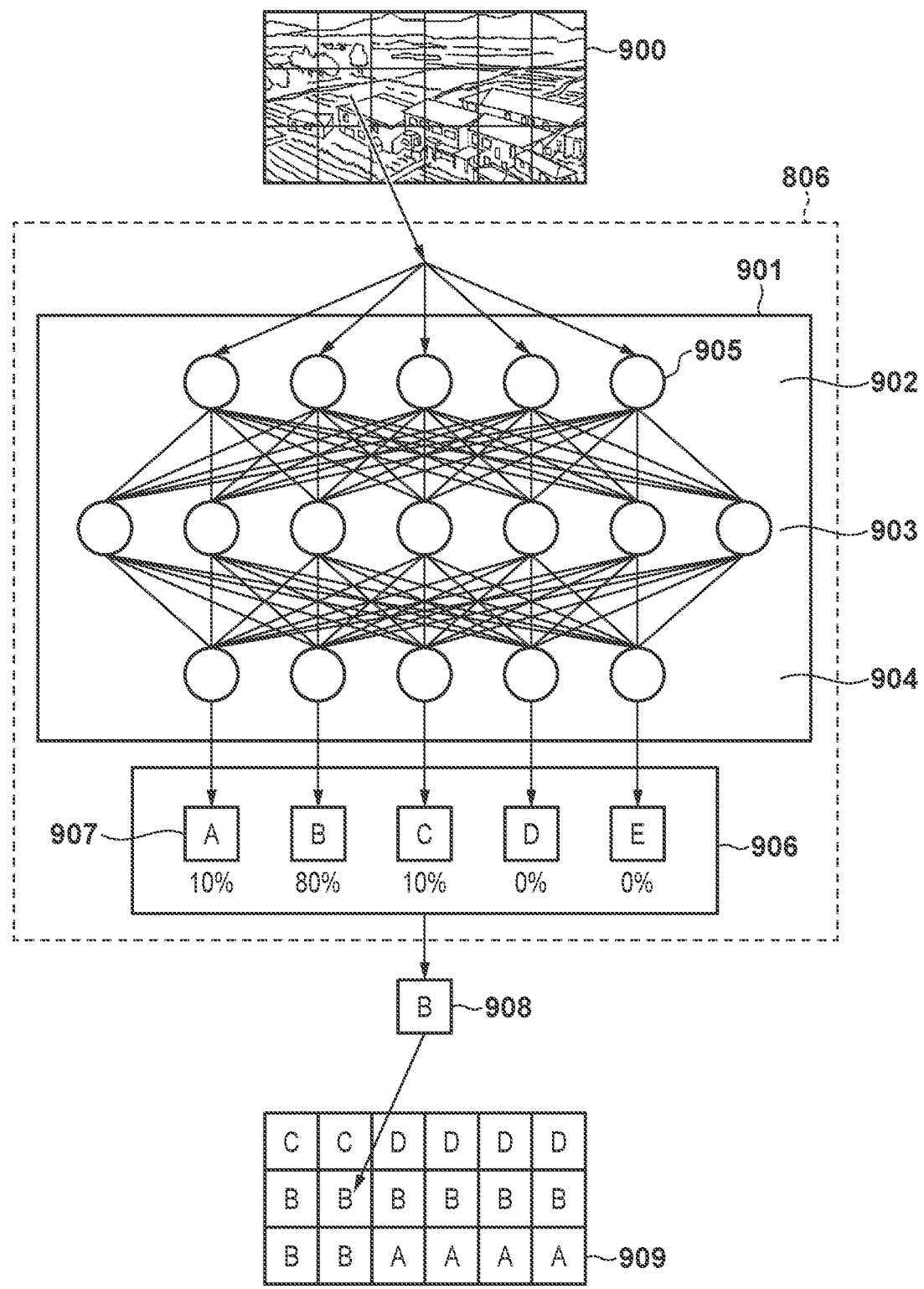
FIG. 9 is a view illustrating functional blocks of the spatial-frequency detecting circuit according to the second embodiment.

FIG. 9 is a view illustrating functional blocks of the spatial-frequency detecting circuit according to the second embodiment. Each divided region corresponding to the divided pixel regions 801 in a low-resolution image 900 are sequentially inputted into nodes 905 of an input layer 902. Regarding detection of the levels of spatial frequency included in the divided pixel regions, the same processing as in the first embodiment is sequentially performed, and the result is outputted to the readout control circuit 804 as a detection result for each region as illustrated in a reference numeral 909 in the drawing.

The readout control circuit 804 performs control to switch a high resolution readout/low resolution readout of the divided pixel regions and the AD converters 803 based on the detection result for each region.

The above-described configuration makes it possible to, also in the image sensing apparatus of the present embodiment, control resolution and power in accordance with a subject similarly to the first embodiment. In addition, the second embodiment can perform control of resolution and power usage that accords with a subject for each region and can perform more appropriate control even in a state in which the spatial frequency that is included is different for each region.

Third Embodiment

Figure 10:
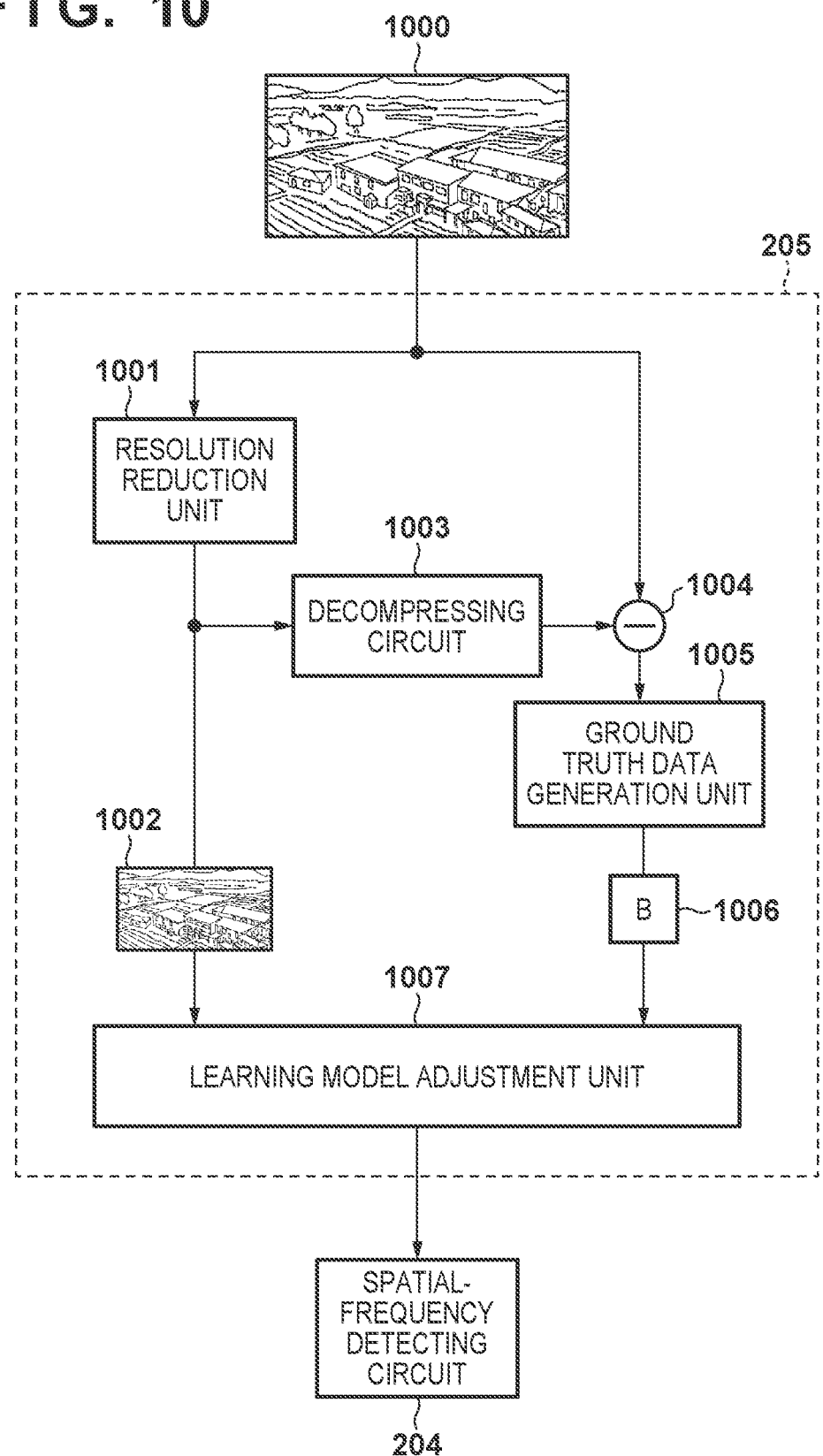
FIG. 10 is a view illustrating functional blocks of the learning circuit according to a third embodiment.

In the following, a configuration of the image sensing apparatus as the image processing apparatus in a third embodiment will be described with reference to FIG. 10.

The third embodiment indicates an example of another configuration of the learning circuit and generates ground truth data of a spatial frequency level by noise that occurs in a low-resolution image due to a low resolution readout. Using this learning model makes it possible to, in the spatial-frequency detecting circuit 204, detect the spatial frequency of noise of a low-resolution image and control to prevent image quality degradation due to noise.

In the following, points that are different from the above first and second embodiments will be described.

In the third embodiment, a pixel signal of one unit pixel among a plurality of unit pixels is outputted as a representative value. For example, by reading out only the pixel unit in even numbered columns/even numbered rows, a low resolution readout of ¼ of the number of pixels is performed. By this, in a low resolution readout, fewer number of AD conversion results are outputted from the AD converters in comparison to a high resolution readout in the same range of a pixel unit. As described above, pixel units are read out discretely at certain intervals; accordingly, there is a possibility that aliasing noise called moiré may occur in a low-resolution image. In the present embodiment, aliasing noise is extracted and used to generate ground truth data.

In the following, a configuration of the learning circuit 205 in the third embodiment will be described. FIG. 10 is a view illustrating functional blocks of the learning circuit 205 according to the third embodiment.

A resolution reduction unit 1001, a decompressing circuit 1003, a subtraction unit 1004 serving as an extraction unit, and a ground truth data generation unit 1005 in the learning circuit 205 differ from the previous embodiments.

The resolution reduction unit 1001 replicates a low resolution readout as in the first embodiment but, in the third embodiment, does not combine pixel signals and outputs a low-resolution image 1002 by reducing resolution by extracting only the pixel signals of even numbered columns/even numbered rows.

The decompressing circuit 1003 decompresses the low-resolution image 1002 to have the same number of pixels as the original high-resolution image. For example, decompression is performed for the number of pixels to be the same as that of the original high-resolution image by quadrupling the number of pixels by duplicating the pixel signal of an extracted unit pixel as signals of neighboring pixels (2 pixels horizontally, 2 pixels vertically).

In the subtraction unit 1004, an original high-resolution image 1000 is subtracted from the decompressed image outputted from the decompressing circuit 1003 and then a difference image is outputted. This makes it possible to output an image (difference image) in which aliasing noise by a low resolution readout has been extracted.

The ground truth data generation unit 1005 performs known spatial frequency detection processing such as a two-dimensional Fourier transform on an aliasing noise extraction image and calculates the spatial frequency of aliasing noise. Then, the spatial frequency of aliasing noise is compared with a predetermined threshold and ground truth data 1006 is generated as a spatial frequency level. More specifically, for example, when the spatial frequency of aliasing noise is low, ground truth data is assigned a level indicating that the original high-resolution image includes high spatial frequency.

In a learned model adjustment unit 1007, similarly to the first embodiment, an output of each node of the learning model is adjusted so as to be able to detect spatial-frequency in association with the spatial frequency level, which is ground truth data, of a high-resolution image from a low resolution reproduced image 1002.

Configuring as such makes it possible to switch to a high resolution readout in a state in which aliasing noise of low spatial frequency that is easily perceived as noise in an image occurs and reduce image quality degradation.

The above-described configuration makes it possible to, also in the image sensing apparatus of the present embodiment, control resolution and power in accordance with a subject similarly to the first and second embodiments. In addition, it becomes possible to control so as to prevent image quality degradation due to aliasing noise.

Fourth Embodiment

In the following, a configuration of the image sensing apparatus as the image processing apparatus in a fourth embodiment will be described with reference to FIG. 11 and FIG. 12.

The fourth embodiment performs a plurality of instances of capturing while shifting the position of the solid-state image sensor by controlling the shift circuit 210 and obtains a high resolution still image by compositing the image obtained in the respective instances of capturing. Also, the fourth embodiment controls the number of image acquisitions (number of instances of capturing) using a display image prior to capturing.

Accordingly, it is assumed that the pixel circuit 200 comprises a mechanism for moving its position and that the controller 103 controls that mechanism. Note that, instead of moving the pixel circuit 200, a transparent plate (glass plate) may be arranged in the foreground of an image formation surface of the pixel circuit 200 and, by rotating this plate and refracting light, change the imaging pixel position.

When the number of image acquisitions is increased, it takes time to acquire all the images; accordingly, when a subject has changed, noise is likely to occur in the composited image. Accordingly, controlling the number of acquisitions in accordance with the spatial frequency of a subject makes it possible to prevent noise occurrence under a condition in which it is difficult to achieve an effect by the above driving. Also, reducing the number of acquisitions makes it possible to reduce the power required to acquire image; accordingly, an effect of reducing power as in the first to third embodiments is achieved.

In the following, the points in which the fourth embodiment differs from the above first to third embodiments will be described.

First, control of the readout control circuit 202 of the fourth embodiment will be described with reference to FIG. 11.

FIG. 11 is a table illustrating a relationship between a detection result and an image acquisition count according to a fourth embodiment. This table is assumed to be stored in a ROM (not shown) within the controller 103.

In a case of a detection result A or B which is a case where a high spatial frequency is included in a high resolution readout, 16 instances of shooting of images are acquired and then composited. Also, in a case of a detection result C or D, four instances of shooting of images are acquired and then composited. Also, in a case of a detection result E, only one instance of shooting of image is acquired and compositing processing is not performed. As a result, an image with at least a resolution that is greater than or equal to that of the pixel circuit 200 can be acquired.

Next, readout control of the image sensing apparatus according to the fourth embodiment will be described with reference to FIG. 12.

FIG. 12 is a timing chart illustrating readout control of the image sensing apparatus according to the fourth embodiment.

The "release" in the drawing indicates a timing that the user operated a release button serving as the operation member 107. Also, "image sensor shift driving" indicates a timing that a drive to shift the position of the solid-state image sensor 100 is performed by control of the shift circuit 210. More specifically, shift drive control will be described with reference to FIG. 13.

In the blank rectangle figures illustrated in the "pixel unit readout control", readout row and timings of unit pixels and combination pixels are illustrated as in the first embodiment. Meanwhile, hatch-patterned rectangle figures illustrate rows and timing of a pixel unit for which to perform a photodiode reset. Also, the number indicating the rows in the drawing indicate the number of rows in view only of the same color, and in practice, processing is performed by two rows of the Bayer array.

In the "overall control computation unit", timings at which to perform processing of generating a high resolution still image by compositing the images of a plurality of instances of shooting performed while shifting the solid-state image sensor are illustrated.

Driving of the image sensing apparatus of the fourth embodiment will be described following the above timings.

At timing t1200, acquisition of a display image used for a live-view display is performed. Regarding display image acquisition, in order to reduce power consumption, a low resolution readout in accordance with resolution of the display 105 is consecutively performed. In a low resolution readout, a photodiode reset and a pixel signal readout are sequentially performed, and a pixel signal that accords with the light incident on the photodiode during the period between the reset to the readout is read out. At this time, in the spatial-frequency detecting circuit 204, a spatial frequency level in storage image acquisition, which is a high resolution readout, is detected based on the read out low-resolution image.

Timing t1201 indicates a timing at which the release button is pressed. When the release button is pressed, the controller 103 ends display image acquisition.

At timing t1202, a spatial frequency detection result of the display image is outputted and, based on that detection result, storage image acquisition is started. In the example of FIG. 12, the detection result is C; accordingly, the controller 103 decides to perform driving of acquisition and compositing of images of four instances of shooting based on the table in FIG. 11. Then, the controller 103 performs shift driving of the solid-state image sensor 100 in accordance with this. Note that in the first readout of one instance of shooting, shift driving can be omitted.

At timing t1203, the controller 103 starts a photodiode reset at the timing that shift driving of the solid-state image sensor 100 has ended.

At timing t1204, the controller 103 starts a pixel signal readout of the pixel circuit 200. At this time, pixel signals that accord with the light incident on the photodiodes in the period between the reset to the readout are read out.

At timing t1205, a high resolution readout of the first instance of shooting ends and a high resolution readout of the second instance of shooting is started. The controller 103, similarly to the first instance of shooting, performs shift driving of the solid-state image sensor 100, photodiode reset, and pixel signal readout processing in order.

Readout of one instance of shooting from timings t1202 to t1205 is performed a designated number of times and, in the example of FIG. 12, is repeated four times.

At timing t1206, acquisition of a storage image of a plurality of instances of shooting ends. The controller 103 performs known compositing processing based on the four acquired images and then generates a high-resolution image.

Next, shift driving of the solid-state image sensor 100 will be described with reference to FIGS. 13A and 13B.

FIGS. 13A and 13B are views illustrating shift driving of the solid-state image sensor according to the fourth embodiment.

FIG. 13A illustrates driving in a case where the image acquisition count N=4 and FIG. 13B illustrates driving in a case where the image acquisition count N=16.

In the pixel circuit 200, unit pixels 1300R, 1300G, and 1300B are arranged in a form of a Bayer array, and FIGS. 13A and 13B have extracted and illustrate a part of that, which is a region of 4 pixels horizontally and 4 pixels vertically.

The unit pixel 1300R comprises a color filter that transmits the wavelength of red light and outputs a pixel signal that accords with red incident light. Similarly, the unit pixel 1300G outputs a pixel signal that accords with green incident light and the unit pixel 1300B outputs a pixel signal that accords with blue incident light.

At image acquisition count N=4, a shift is sequentially performed by an amount equivalent to a pixel interval in a horizontal direction/vertical direction on a plane orthogonal to an optical axis using the first instance of shooting as the reference. Shifting as such makes it possible to, when focusing on, for example, the unit pixel 1300R, obtain by the unit pixel 1300R a pixel signal that accords with red incident light also in the positions of the unit pixels 1300G and 1300B of the first instance of shooting. Shooting while shifting the solid-state image sensor 100 and then performing compositing processing as described above makes it possible to improve spatial resolution of each color and acquire a high-resolution image.

Meanwhile, at image acquisition count N=16, an image is acquired by shifting the solid-state image sensor 100 to a total of 16 positions (4 positions horizontally, 4 positions vertically) by a shift amount of half a pixel interval. In this way, it is possible to, when focusing on, for example, the unit pixel 1300R, obtain an output that is shifted by half a pitch and is overlapped compared to a case where the image acquisition count N=4. Comparing the pixel signals that are shifted by half a pitch and are overlapped makes it possible to detect a change in the amount of incident light in a position smaller than a pixel interval; accordingly, it becomes possible to generate an ultra-high-resolution image, which mimics a case where the pixel interval has been halved (i.e., resolution has been quadrupled).

The above-described configuration makes it possible to, in the driving for obtaining a high resolution still image by shooting images of a plurality of instances of shooting while shifting the position of the solid-state image sensor and then compositing the images, regulate the number of image acquisitions using a display image prior to shooting. Also, it is possible to, in a state in which it is difficult to obtain an effect of improving resolution by compositing a plurality of shots, perform reduction of noise occurrence due to change in a subject and reduction of power required for image acquisition by reduction of the number of acquisitions. As described above, it possible to, also in the image sensing apparatus of the present embodiment, control resolution and power in accordance with a subject similarly to the first to third embodiments.

Variation

In the above first to fourth embodiments, the image sensing apparatus comprises the spatial-frequency detecting circuit and the learning circuit and performs detection of the level of spatial frequency in relation to an image before development processing is performed. In contrast to this, configuration may be taken so as to arrange the spatial-frequency detecting circuit and the learning circuit outside the image sensing apparatus and detect the level of spatial frequency in relation to an image after development processing is performed.

For example, in a network camera system, a configuration in which video data generated in an image sensing apparatus is transmitted to an information processing apparatus such as an edge computer or a cloud server is common. Configuration may be taken such that the information processing apparatus comprises the spatial-frequency detecting circuit and the learning circuit, detects the spatial frequency of developed video data transmitted from the image sensing apparatus, and in accordance with this detection result, controls the size of image data that the image sensing apparatus outputs.

At this time, the image sensing apparatus does not necessarily need to switch the high resolution readout and the low resolution readout and configuration may be taken so as to change the compression rate or the resizing rate of a readout image. In a case of changing the compression rate or the resizing rate of an image, the rate of operation of AD converters are not reduced; accordingly, an effect cannot be expected in terms of reducing the power of the image sensing apparatus. However, reducing the size of image data to be outputted makes it possible to obtain an effect of reducing the frequency band to be used by video data at the time of communication or reducing memory usage for when storing video data.

In such a case, it is possible to generate a learning model that supports respective compression rates by inputting, into the learning circuit, ground truth data based on a spatial frequency level of an image before compression and an image that has been compressed at each compression rate. Alternatively, it is possible to generate a learning model that supports respective resizing rates by inputting ground truth data based on a spatial frequency level of an image before resizing and an image that has been resized at each resizing rate. In either case, it becomes possible to estimate the spatial frequency on a high frequency side from a low resolution image.

Note that configuration may be taken so as to, in a case where the compression rate or the resizing rate is changed along the way, output as another video data around that change. Also, the present invention is not limited to video data and can also be applied to interval shooting.

Other Embodiments

Embodiment(s) of the present invention can also be realized by a computer of a system or apparatus that reads out and executes computer executable instructions (e.g., one or more programs) recorded on a storage medium (which may also be referred to more fully as anon-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2020-135070, filed Aug. 7, 2020 which is hereby incorporated by reference herein in its entirety.

What is claimed is:

1. An image processing apparatus, comprising:
 a controller configured to cause an image sensing device to execute either a first mode in which causing the image sensing device to output image data of a first resolution, or a second mode in which causing the image sensing device to output image data of a second resolution lower than the first resolution; and an evaluating circuit configured to, by causing the image sensing device to output image data of the second resolution in relation to acquired image data, obtain an index value that relates to a spatial frequency of a frequency band in which a signal level decreases in image data of the second resolution more than in image data of the first resolution, wherein the evaluating circuit detects, by machine learning, the index value of image data of the second resolution, and the controller, based on the index value detected by the evaluating circuit, selects either the first or second mode.

2. The apparatus according to claim 1, wherein the controller more preferentially selects the first mode over the second mode the higher a degree of spatial frequency of an index value is for a frequency band, in which a signal level decreases in image data of the second resolution in relation to image data of the first resolution.

3. The apparatus according to claim 1, wherein the evaluating circuit detects the index value for each of a plurality of divided pixel regions into which image data is divided, and the controller, in accordance with the index value for each divided pixel region, selects either the first or second mode.

4. The apparatus according to claim 1, further comprising a learning circuit configured to cause the evaluating circuit to perform machine learning, wherein the learning circuit learns based on an index value of a spatial frequency of an image of a first resolution and an index value of a spatial frequency of an image of a second resolution obtained by converting the image of the first resolution by a converter.

5. The apparatus according to claim 1, further comprising a learning circuit configured to cause the evaluating circuit to perform machine learning, wherein the learning circuit, in a case where an image of the first resolution is outputted from the image sensing device, converts the image of the first resolution to image data of the second resolution; and learns by inputting an index value of a spatial frequency of a difference image, which was obtained by obtaining a difference between the image of the first resolution obtained by decompressing an image of the second resolution and the image of the first resolution before converting to image data of the first resolution, and an image of the second resolution obtained by conversion by a converter.

6. The apparatus according to claim 1, wherein the image sensing device comprises: a pixel unit in which a unit pixel configured to include a photoelectric converter that photoelectrically converts incident light is arranged in an array; and an AD converter configured to perform AD conversion of a pixel signal of the unit pixel in the pixel unit, wherein the controller controls the AD converter and, in the second mode, outputs an AD conversion result of a lower number than the first mode.

7. A method of controlling an image processing apparatus, comprising the steps of:

(a) controlling an image sensing device to execute either a first mode in which causing the image sensing device to output image data of a first resolution, or a second mode in which causes the image sensing device to output image data of a second resolution lower than the first resolution; and (b) by causing the image sensing device to output image data of the second resolution in relation to acquired image data, obtaining an index value that relates to a spatial frequency of a frequency band in which a signal level decreases in image data of the second resolution more than in image data of the first resolution, wherein in the step (b), by machine learning, the index value of image data of the second resolution is obtained, and in the step (a), based on the index value detected in the step (b), either the first or second mode is selected.

8. A non-transitory computer-readable storage medium storing a program which, when read and executed by a computer, causes the computer to execute the steps of a method of controlling an image processing apparatus, comprising the steps of:

(a) controlling an image sensing device to execute either a first mode in which causes the image sensing device to output image data of a first resolution, or a second mode in which causes the image sensing device to output image data of a second resolution lower than the first resolution; and (b) by causing the image sensing device to output image data of the second resolution in relation to acquired image data, obtaining an index value that relates to a spatial frequency of a frequency band in which a signal level decreases in image data of the second resolution more than in image data of the first resolution, wherein in the step (b), by machine learning, the index value of image data of the second resolution is obtained, and in the step (a), based on the index value detected in the step (b), either the first or second mode is selected.

* * * * *